United States Patent [19]
Takeuchi et al.

[11] Patent Number: 6,123,460
[45] Date of Patent: Sep. 26, 2000

[54] HYDRODYNAMIC GAS BEARING STRUCTURE AND OPTICAL DEFLECTION SCANNER COMPRISING THE SAME

[75] Inventors: Hisao Takeuchi; Kaoru Murabe; Osamu Komura; Tomoyuki Awazu, all of Itami, Japan

[73] Assignee: Sumitomo Electric Industries, Ltd., Osaka, Japan

[21] Appl. No.: 09/171,999

[22] PCT Filed: Feb. 23, 1998

[86] PCT No.: PCT/JP98/00740

§ 371 Date: Oct. 28, 1998

§ 102(e) Date: Oct. 28, 1998

[87] PCT Pub. No.: WO98/38434

PCT Pub. Date: Sep. 3, 1998

[30] Foreign Application Priority Data

Feb. 28, 1997 [JP] Japan ................................. 9-045985
Feb. 18, 1998 [JP] Japan ................................. 10-035591

[51] Int. Cl.[7] .................................................... F16C 32/06
[52] U.S. Cl. .................................................... 384/100
[58] Field of Search .................................... 384/100, 114, 384/115

[56] References Cited

U.S. PATENT DOCUMENTS

| | | | |
|---|---|---|---|
| 4,512,626 | 4/1985 | Kamiya et al. . | |
| 5,593,230 | 1/1997 | Tempest et al. | 384/100 |
| 5,628,567 | 5/1997 | Murabe et al. | 384/115 X |
| 5,731,831 | 3/1998 | Murab et al. | 384/115 X |
| 5,746,515 | 5/1998 | Takahashi et al. | 384/115 |
| 5,863,134 | 1/1999 | Chen | 384/100 X |
| 5,909,966 | 6/1999 | Suzuki et al. | 384/115 |
| 5,944,427 | 8/1999 | Murabe et al. | 384/115 |

FOREIGN PATENT DOCUMENTS

| | | |
|---|---|---|
| 54-127044 | 9/1979 | Japan . |
| 58-224324 | 12/1983 | Japan . |
| 61-201916A | 9/1986 | Japan . |
| 02093115A | 4/1990 | Japan . |
| 2-15726 | 4/1990 | Japan . |
| 05011715A | 1/1993 | Japan . |
| 8312639 | 11/1996 | Japan . |
| 09014257A | 1/1997 | Japan . |

OTHER PUBLICATIONS

Shinichi Tohgo, "Gas Bearing", published by Kyoritsu Shuppan (1984), pp. 4 to 7, with partial English Translation.

Atsunobu Mori, "About Whirling of Gas Bearing", in "Lubrication" vol. 20, No. 7 (1975) pp. 481–488, with partial English Translation.

Primary Examiner—David A. Bucci
Assistant Examiner—Colby Hansen
Attorney, Agent, or Firm—W. F. Fasse; W. G. Fasse

[57] ABSTRACT

A hydrodynamic gas bearing structure can prevent the occurrence of whirl not only in high-speed rotation but also in low-speed rotation, and is capable of suppressing dispersion of a floating rotational frequency. The hydrodynamic gas bearing structure includes a shaft body (1) and a bearing body (2). A groove (11) is formed on the outer peripheral surface of the shaft body (1). The groove (11) consists of at least two concave parts, of which the depths substantially differ from each other, which are formed serially in the circumferential direction, and which each have a circumferentially asymmetrical shape in a cross section perpendicular to the axis. A circumferential distance a is defined between the intersection point (15) of the outer circular peripheral line (Q) of the shaft body and a line (C) connecting the deepest point (14) of the groove (11) with the center (O) of the shaft body (1), and one edge (16) of the groove (11) positioned downstream with respect to an air current (P) generated during rotation in relation to the intersection point (15). This circumferential distance a is larger than the circumferential distance b between the intersection point (15) and the other edge (17) of the groove (11) positioned upstream with respect to the air current (P) in relation to the intersection point (15). The hydrodynamic gas bearing structure is employed for a rotation driving part of an optical deflection scanner.

10 Claims, 7 Drawing Sheets

HYDRODYNAMIC GAS BEARING STRUCTURE AND OPTICAL DEFLECTION SCANNER COMPRISING THE SAME

CROSS-REFERENCE TO RELATED APPLICATION

This application is related to copending U.S. application 09/172,000, filed on Oct. 28, 1998.

TECHNICAL FIELD

The present invention generally relates to a hydrodynamic gas bearing structure, and more specifically, it relates to a hydrodynamic gas bearing structure supporting a rotator rotating at a high speed and an optical deflection scanner comprising the same.

BACKGROUND DISCUSSION

In recent years, high rotational accuracy is being required of a rotation driving part, such as an optical deflection scanner, for example, or a magnetic recording apparatus or a laser beam printer along with a high rotational speed. In order to rotate a precision motor of which such high rotational speed and high rotational accuracy are required at a higher speed, it has been proposed to use a gas bearing (hydrodynamic gas bearing) for the rotation driving part. In the rotation driving part employing this gas bearing, air is forcibly introduced into at least a clearance between a radial gas bearing body and a rotator when the rotator rotates. Thus, the air pressure in the clearance is increased, and the rotator rotates at a high speed through the gas bearing. Thus, maintenance of the rotational accuracy is expected also during high-speed rotation, by employing the gas bearing.

In the aforementioned radial gas bearing, a wedge clearance is formed by eccentricity of a shaft body in the bearing body, as shown in "Gas Bearing" by Shinichi Tohgo, Kyoritsu Shuppan (1984), for example. Pressure is generated when air passes through this wedge clearance since the air is compressed. Thus, it becomes possible to support the shaft body and the bearing body in a non-contact manner.

According to "About Whirl of Gas Bearing" by Atsunobu Mori, pp. 481 to 488, "Lubrication" Vol. 20, No. 7 (1975), however, an unstable phenomenon called "whirl" (H/W) is observed in a cylindrical journal bearing when set in an unloaded state such as the case of supporting a vertical shaft or the like. This phenomenon is such that the shaft is pressed against the bearing surface by centrifugal force to whirl in the interior of the bearing. In the cylindrical journal bearing, the bearing center and the rotation center deviate from each other by a static load to generate pressure in one portion and bring about stable rotation. In case of employing the cylindrical journal bearing for a vertical structure, i.e. a structure supporting a vertical shaft or the like, however, the bearing is set in an unloaded state and hence a pressure-producing point changes by disturbance and the rotation becomes unstable.

In case of applying the aforementioned hydrodynamic gas bearing to a rotation driving part of a magnetic recording apparatus such as a hard disk drive or a laser printer, the aforementioned unstabilizing factor must be eliminated since the positional accuracy of the rotator is regarded as important.

Accordingly, there is proposed in Japanese Patent Publication No. 4-21844 (corresponds to Japanese Patent Laying-Open No. 58-224324) that the generated pressure may be increased by forming shallow grooves equally circumferentially distributed mainly on a side of a shaft body, serving as a rotator, into which gas flows by rotation distribution, to improve whirling stability in high-speed rotation, i.e. to prevent a whirl phenomenon.

Further, there is proposed in Japanese Patent Laying-Open No. 8-312639 means of forming at least three grooves extending in the axial direction and equally circumferentially distributed on a shaft body and controlling the groove shape, thereby improving whirl stability in high-speed rotation and preventing a whirl phenomenon.

Figure 8:
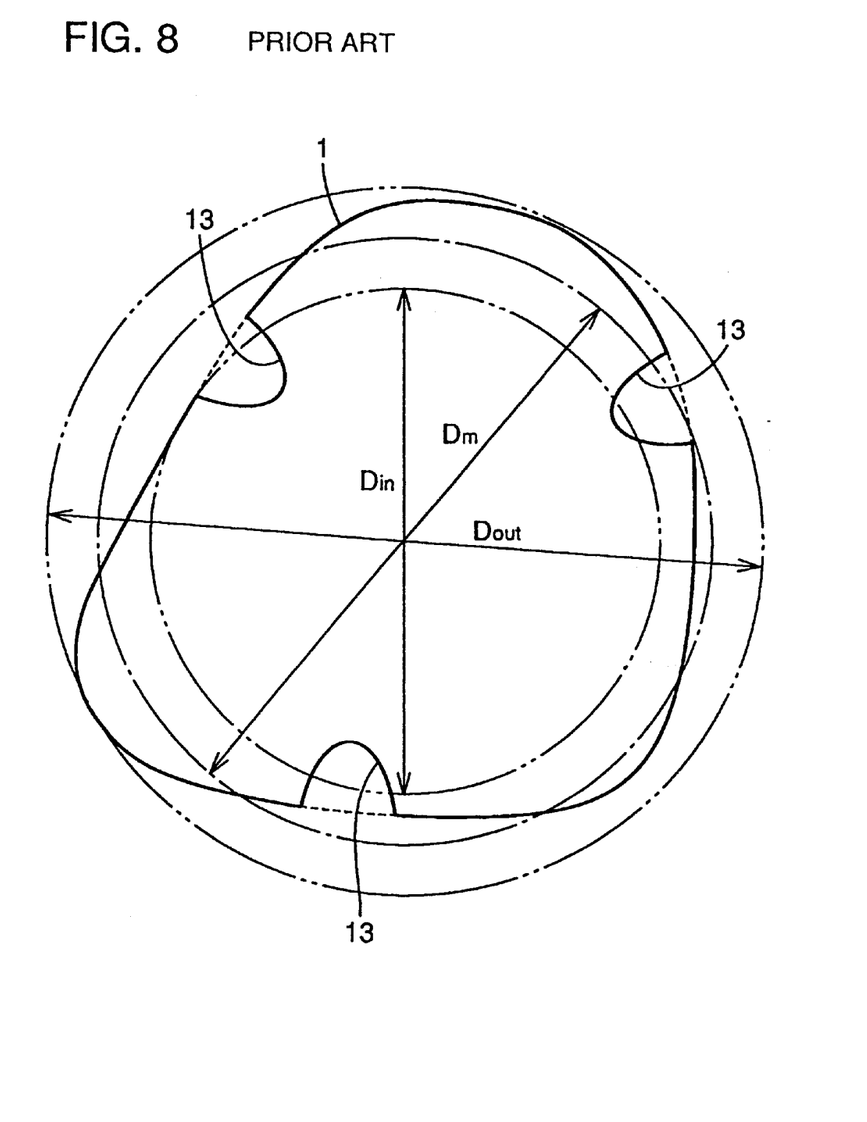
FIG. 8 is a cross-sectional view of a conventional shaft body.

According to experiments by the inventors, however, it has been proved that there are the following problems in case of forming grooves on a shaft body in accordance with the aforementioned proposals, although a whirl phenomenon in high-speed rotation can be suppressed:

FIG. 8 is a cross-sectional view of a shaft body. As shown in FIG. 8, three portions of grooves 13 are formed on the outer peripheral surface of the shaft body 1. In this case, the shape of the grooves 13 has a laterally symmetrical shape in the circumferential direction of the shaft body 1. The outer peripheral surface of the shaft body 1 has portions which are circumscribed with a circle having a diameter Dout and inscribed with a circle having a diameter Din. The average diameter of the shaft body 1 is shown by Dm.

When forming a hydrodynamic gas bearing structure with the shaft body 1 having such a cross section, it is possible to suppress a whirl phenomenon in high-speed rotation. However, dispersion results in the rotational frequency at the time of rotating/starting the shaft body 1 to shift from such a state that the shaft body and a bearing body are in contact with each other to a non-contact state, or the rotational frequency when the shaft body and the bearing body shift from a non-contact state to a contact state when reducing the rotational speed from a state of constant uniform rotation of a high speed to stop the rotation, i.e. "floating rotational frequency". In particular, there has been such a problem that this floating rotational frequency may extremely increase. Thus, there has been such a problem that it is impossible to shift the shaft body and the bearing body from the contact state to the non-contact state at a low rotational frequency but the shaft body and the bearing body are continuously in contact with each other at a relatively high rotational frequency in starting or stoppage of rotation thereby causing abrasion powder. In addition, there has also been such a problem that galling is caused between the shaft body and the bearing body by the abrasion powder.

It has been proved that the aforementioned dispersion of the floating rotational frequency is correlated with the fact that the outer peripheral shape of the shaft body deviates from a complete round or circle as shown in FIG. 8. Namely, it has been proved that the aforementioned dispersion of the floating rotational frequency is large as the out-of-roundness (=(radius of circumscribed circle: Dout/2)−(inscribed circle radius: Din/2)) of the outer peripheral portion of the shaft body 1 excluding the grooves is large. In manufacturing of the shaft body, there has been such a problem that a probability in which a shaft body whose floating rotational frequency is high is manufactured increases, and the manufacturing yield lowers as a result.

Accordingly, an object of the present invention is to provide a hydrodynamic gas bearing structure which can effectively prevent a whirl phenomenon and is capable of preventing a wear phenomenon in starting or stoppage of rotation, and an optical deflection scanner comprising the bearing structure.

Further, another object of the present invention is to provide a hydrodynamic gas bearing structure which is capable of suppressing dispersion of a floating rotational frequency in starting or stoppage of rotation, and an optical deflection scanner comprising the bearing structure.

In addition, still another object of the present invention is to improve the manufacturing yield of a shaft body in a hydrodynamic gas bearing structure.

SUMMARY OF THE INVENTION

A hydrodynamic gas bearing structure according to the present invention comprises a columnar shaft body and a hollow cylindrical bearing body which is opposed to this shaft body while keeping a clearance therebetween in the radial direction. When arranging the shaft body and the bearing body so that the respective central axes coincide with each other, a substantially cylindrical clearance is being formed by the outer peripheral surface of the shaft body and the inner peripheral surface of the bearing body. The shaft body has a groove extending in the axial direction on the outer peripheral surface. Here the groove indicates that there is a clear deviation of the outer peripheral surface of the shaft body from a complete round shape toward the center or radially inward direction, and the outline of the outer peripheral surface after groove formation may not necessarily be a concave shape.

As to concave parts such as grinding marks of fine widths in a concave part on a groove forming section in the present invention, it is assumed that each of such features is not included as the groove. Such concave parts of a fine width or dimension have also been omitted from the drawings described in the following. Namely, a concave part regarded as the groove in the present invention does not include any concave part of a fine width detected by a surface roughness meter but includes waviness detectable with an out-of-roundness measurer, and the roughness standard of the width of the concave part regarded as the groove in the present invention is that of a degree exceeding 30 $\mu$m.

The groove has a circumferentially asymmetrical shape, as follows. A circumferential distance a is defined along the virtual outer peripheral line corresponding to the outer contour of the shaft body before the groove is formed. Specifically, the circumferential distance a extends along the virtual outer peripheral line between the intersection point of the outer peripheral line and a line connecting the deepest point of the groove and the center of the shaft body on the one hand, and one edge of the groove positioned downstream with respect to an air current generated when either the shaft body or the bearing body rotates in relation to the intersection point on the other hand. The circumferential distance a is larger than the circumferential distance b between the above mentioned intersection point and the other edge of the groove positioned upstream with respect to the air current in relation to the intersection point in a cross section perpendicular to the axis of the shaft body.

Figure 1:
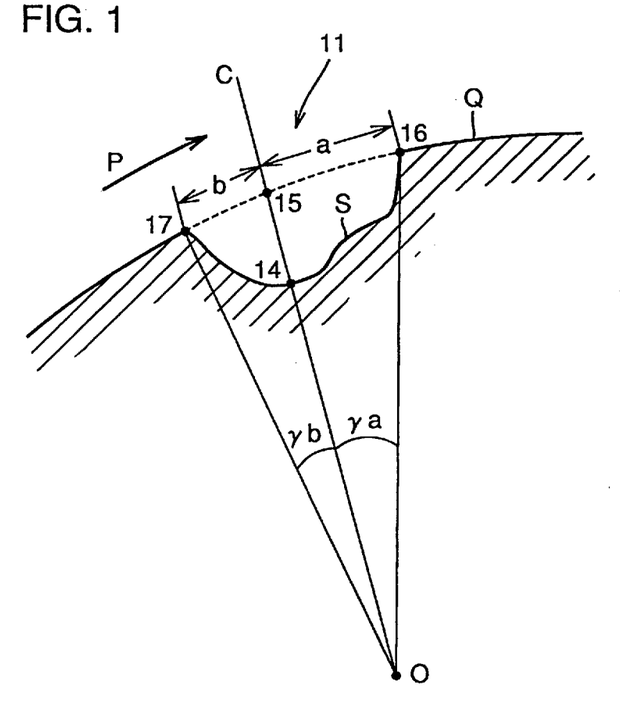
FIG. 1 is a partial cross-sectional view showing the sectional shape of the groove in the hydrodynamic gas bearing structure according to the present invention.

The groove defined as described above is concretely described as follows with reference to FIG. 1. As shown in FIG. 1, an intersection point 15 is the intersection point of a line C connecting the deepest point 14 of the groove and the center O of a shaft body and the outer peripheral line Q in a cross section perpendicular to the axis. It is assumed that an air current is generated in the direction shown by arrow P when either the shaft body or a bearing body rotates. A distance a (in the present invention, a circumferential distance is expressed in the magnitude of a central angle corresponding to the distance, as shown in FIG. 1, namely, an angle γa in FIG. 1) is the circumferential distance between the intersection point 15 and one edge 16 of the groove positioned downstream with respect to the air current P in relation to the intersection point 15. A distance b (similarly an angle γb shown in FIG. 1) is the circumferential distance between the intersection point 15 and the other edge 17 of the groove positioned upstream with respect to the air current P in relation to the intersection point 15. The groove 11 has an asymmetrical shape in the circumferential direction so that the distance a becomes larger than the distance b in the cross section perpendicular to the axis, i.e. the cross section shown in FIG. 1.

Here, the positions of both edges 16 and 17 of the groove 11 indicate points where the profile line S of the groove 11 in the cross section shown in FIG. 1 intersects with the outer peripheral line Q. Further, the present invention defines the shape of an actual groove in an outline drawing developing the locus of a depth from the outer peripheral surface of the shaft body read from a cross-sectional profile of the groove traced with an out-of-roundness measurer in the circumferential direction. In such a profile of the groove, a fine amplitude waveform cause when working the groove forming its base line is included. In a concave part of the groove defined in the present invention, however a concave part along such a fine amplitude waveform is not included. For example, a concave part of a fine width is not included in the groove of the present invention as described above.

Preferably, the groove consists of at least two concave parts, whose depths substantially differ from each other, which are formed serially in the circumferential direction of the shaft body.

According to the hydrodynamic gas bearing structure of the present invention structured as described above, the following basic effects can be achieved:

(i) Prevention of a wear phenomenon in starting or stoppage of rotation.

(ii) Suppression of dispersion of a floating rotational frequency in starting or stoppage of rotation.

(iii) Improvement of the manufacturing yield of the shaft body in the hydrodynamic gas bearing structure.

Further, an optical deflection scanner comprising the basic hydrodynamic gas bearing structure according to the present invention exhibits the aforementioned functions/effects.

DETAILED DESCRIPTION OF PREFERRED EMBODIMENTS AND BEST MODE FOR CARRYING OUT THE INVENTION

If a hydrodynamic gas bearing structure is formed with a groove extending in the axial direction and having a shape laterally symmetrical in the circumferential direction on the outer peripheral surface of a shaft body, then the shaft body and a bearing body may come into contact with each other to cause a wear phenomenon during rotation of a relatively high speed even if fine irregularity of a part excluding the groove exists on the outer peripheral surface of the shaft body, i.e. even if the out-of-roundness of the shaft body is relatively small. This may cause a problem leading to wear.

In the hydrodynamic gas bearing structure according to the present invention, on the other hand, a groove having a circumferentially asymmetrical sectional shape is formed. Namely, this groove has such an asymmetrical shape that the ratio of a/b in FIG. 1 exceeds 1, as shown in FIG. 1 as already described. Further, this groove has at least two concave parts whose depths substantially differ from each other, which are formed serially in the circumferential direction of the shaft body in general. In this case, a hydrodynamic gas bearing structure generating a gas hydrodynamic condition is structured by arranging the deep concave part on a side into which gas flows by rotation, i.e. on a side upstream with respect to an air current formed by rotation. Thus, it becomes possible to suppress dispersion of the floating rotational frequency and to improve the manufacturing yield of the shaft body even when the out-of-roundness of the shaft body material is relatively large. When reversing the rotational direction, the floating rotational frequency increases.

Figure 2:
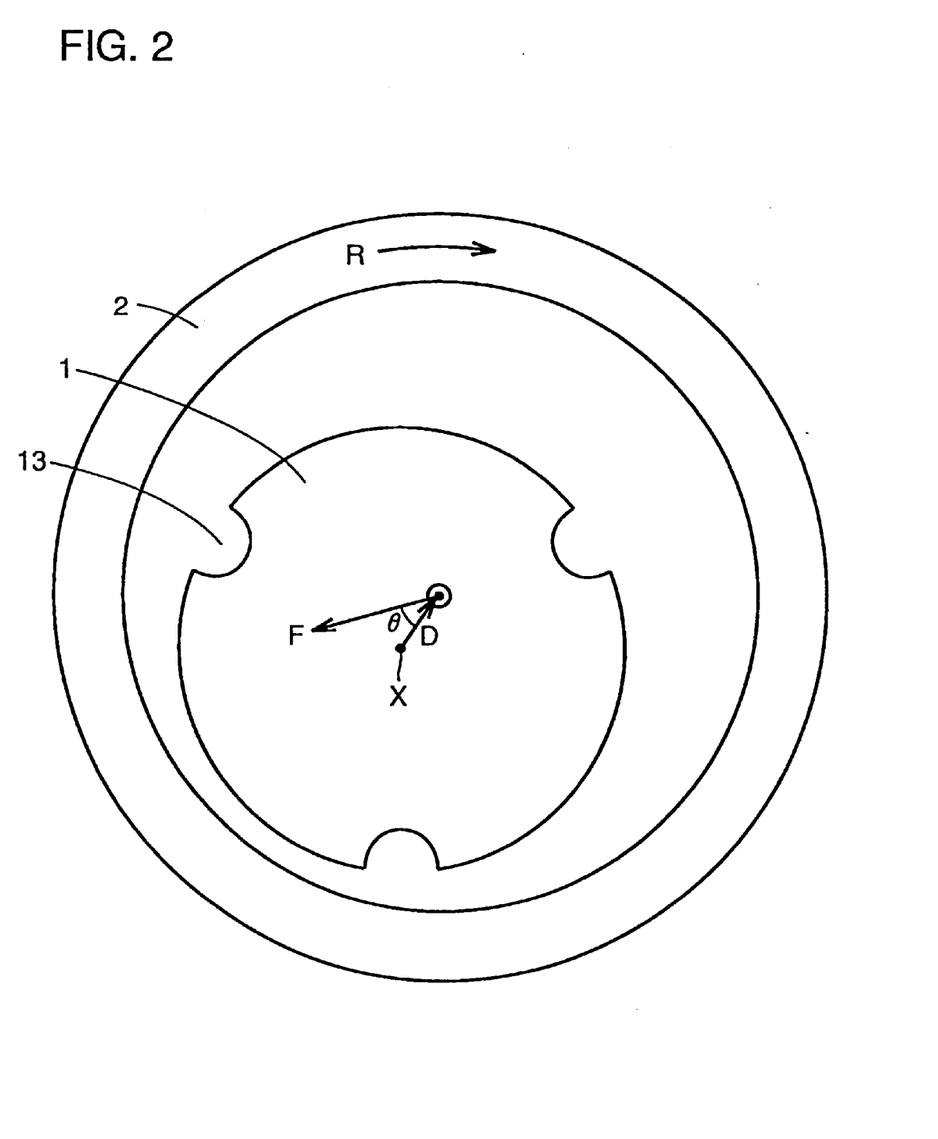
FIG. 2 is a diagram showing a schematic cross section of a hydrodynamic gas bearing structure having grooves of laterally symmetrical sectional shapes for illustrating the cause of dispersion of a floating rotational frequency.

FIG. 2 is a cross-sectional view schematically showing a hydrodynamic gas bearing structure having grooves of a laterally symmetrical sectional shape. Referring to FIG. 2, it is assumed that a shaft body 1 is decentered inside a shaft body 2 and whirls. Grooves 13 having a laterally symmetrical shape in the circumferential direction are formed on the outer peripheral surface of the shaft body 1. The bearing body 2 rotates in a direction shown by arrow R. At this moment, the center (mark ○) of the bearing body 2 is displaced from the center (mark X) of the shaft body 1 in a direction shown by arrow D. At this time, a direction of motion caused by hydrodynamic forces generated by rotation is shown by arrow F. The angle θ between the displacement direction D and the direction F caused by the hydrodynamic is defined as an eccentric angle. Occurrence of whirl which is the cause of increase of the floating rotational frequency in rotation starting or stoppage mainly depends on the magnitude of the eccentric angle in stable rotation. While it is described in Japanese Patent Publication No. 4-21844 that whirling stability (mainly in high-speed rotation) improves as the generated hydrodynamic force is high, the inventors consider that the whirling stability is more largely influenced by the eccentric angle and whirling readily takes place when force is generated at a significant eccentric angle in front of the displacement direction.

This eccentric angle exerts large influence on the whirling stability even if the same slightly changes. For example, a difference of 1° of the eccentric angle θ has a definitive meaning on the presence or absence of whirl occurrence. Namely, even if change of the eccentric angle θ in case of the shaft body having grooves having a circumferentially asymmetrical sectional shape is slight, it has an effect of suppressing whirl as a result.

Dispersion of the floating rotational frequency resulting from deviation of a part other than the groove from a complete round or circle is also caused by increase or dispersion of the aforementioned eccentric angle θ. By forming a groove having a circumferentially asymmetrical shape, therefore, dispersion of the floating rotational frequency resulting from deviation from a complete round can also be suppressed as a result.

On the other hand, there is such a problem that rigidity of the shaft body is reduced due to the removal of shaft material along the groove. The groove having a circumferentially asymmetrical sectional shape is higher in suppression effect for a whirl phenomenon than a groove having a circumferentially symmetrical sectional shape, if it has the same sectional area as the groove having the circumferentially symmetrical sectional shape. Therefore, a desired effect can be attained by forming a relatively shallow groove. Consequently, the rigidity of the shaft body can be improved.

Figure 3:
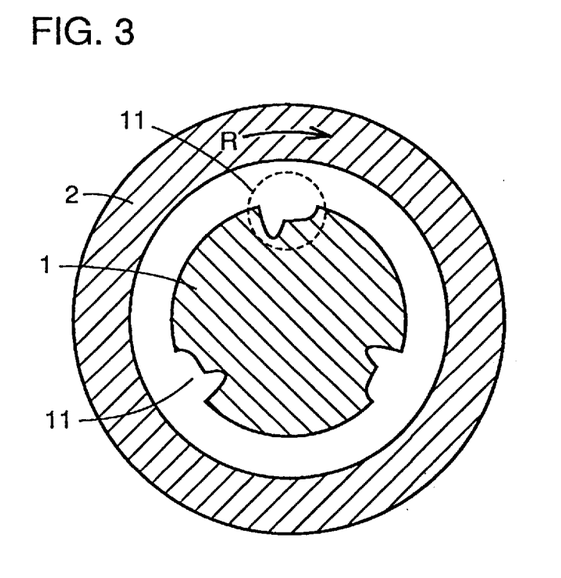
FIG. 3 is a cross-sectional view showing the hydrodynamic gas bearing structure according to the present invention.

FIG. 3 is a cross-sectional view schematically showing the hydrodynamic gas bearing structure according to the present invention. Grooves 11 are formed on the outer peripheral surface of a shaft body 1. A hollow cylindrical bearing body 2 is opposed to the shaft body 1 while keeping a clearance in the radial direction. The bearing body 2 is so arranged as to rotate in a direction shown by arrow R.

Figure 4:
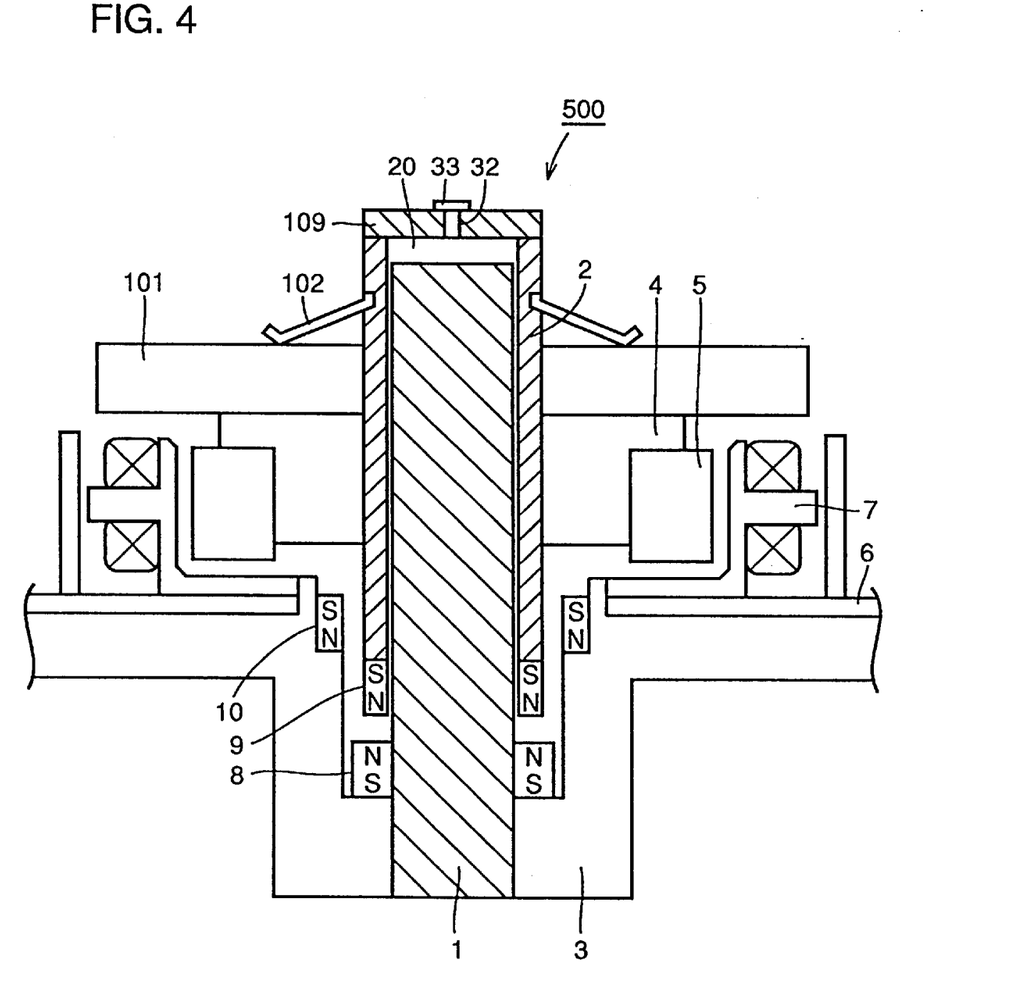
FIG. 4 is a schematic diagram showing a rotation driving part of an optical deflection scanner comprising the hydrodynamic gas bearing structure according to the present invention.

The details of a rotation driving part (driving part for a polyhedral mirror) comprising the hydrodynamic gas bearing structure according to the present invention are shown in FIG. 4. The rotation driving part shown in FIG. 4 is assembled into a laser beam printer apparatus employing an optical deflection scanner shown in FIG. 5.

Referring to FIG. 4, a fixed shaft 1 is fixed to a housing 3 of a drive motor 500 as a shaft body (shaft) consisting of a ceramic material. A rotary sleeve 2 is rotatably engaged with the fixed shaft 1 as a bearing body (sleeve) consisting of a ceramic material. Grooves shown in FIG. 3, and in detail in FIG. 1, are formed and arranged on the outer peripheral surface of the fixed shaft (shaft) 1 in a plurality of portions. A flange 4 consisting of aluminum, brass or the like is fixed to the outer periphery of the rotary sleeve 2 by shrink fit or the like. A drive magnet 5 is fixed to the outer periphery of this flange 4 by adhesion or the like. Further, a substrate 6 is fixed onto the housing 3. A stator 7 is arranged on the substrate 6 to be opposed to the drive magnet 5, whereby the drive motor 500 rotating the rotary sleeve 2 is structured.

To the lower end of the rotary sleeve 2, on the other hand, a second permanent magnet 9 is so fixed that the same type of magnetic pole as a first permanent magnet 8 which is arranged on the fixed shaft 1 is opposed in the vertical direction. On a portion of the housing 3 in the vicinity of the rotary sleeve 2, further, a third permanent magnet 10 is so arranged that repulsive force acts in a direction pressing the second permanent magnet 9 which is fixed to the lower end of the rotary sleeve 2 toward the first permanent magnet 8 which is provided on the fixed shaft.

Further, a lid 109 covering the fixed shaft 1 is provided on the upper end of the rotary sleeve 2. Thus, an air reservoir 20 is formed between the rotary sleeve 2 and the fixed shaft 1. An air vent hole 32 is provided in this lid 109, to simplify assembling of the rotary sleeve 2 and the fixed shaft 1. A sealing member 33 is fixed to seal the air vent hole 32 after the assembling.

Figure 5:
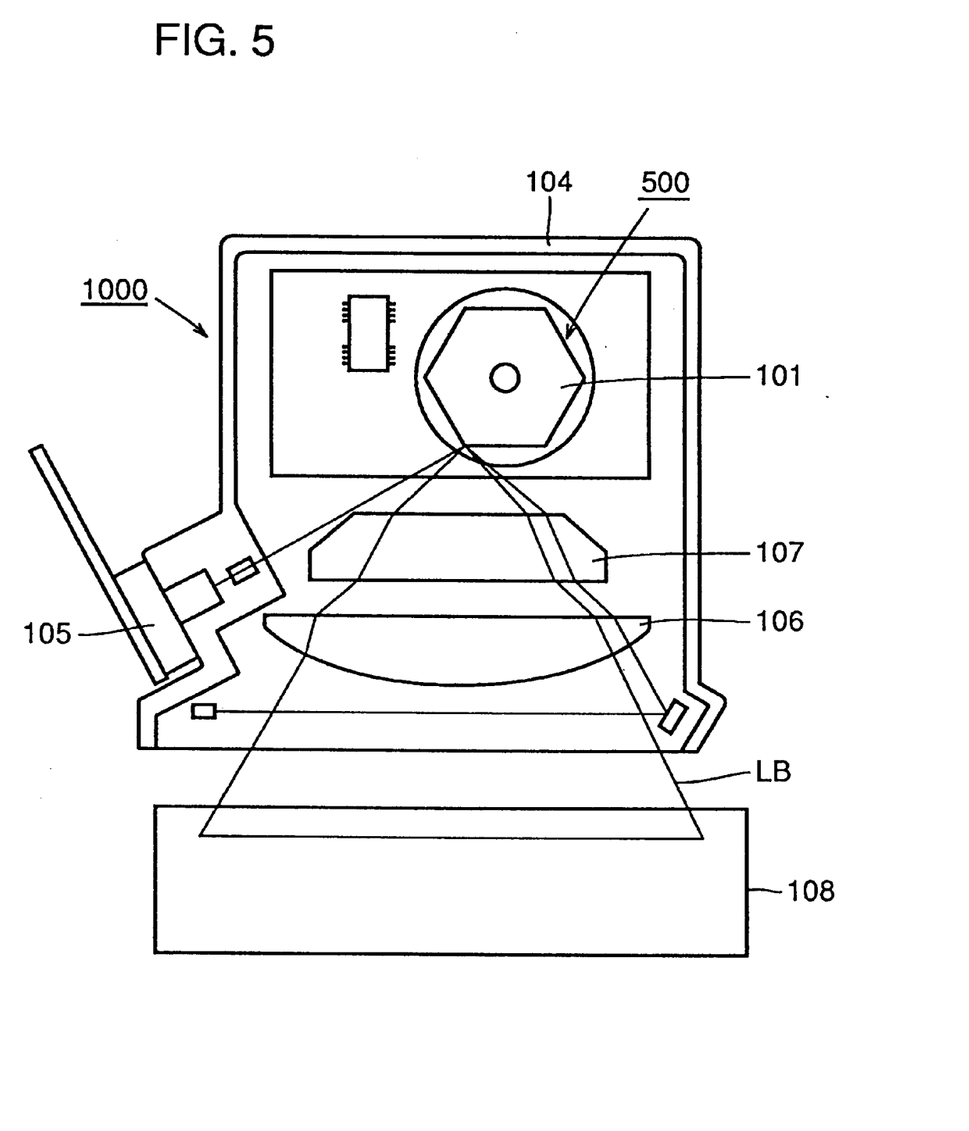
FIG. 5 is a schematic diagram showing an embodiment of a laser beam printer apparatus employing the optical deflection scanner comprising the hydrodynamic gas bearing structure according to the present invention.

A rotating polygon mirror 101 is fixed to the flange 4 by plate springs 102 or the like. The drive motor 500 thus structured is assembled into an optical box 104 of the optical deflection scanner, as shown in FIG. 5. The rotating polygon mirror 101 is rotated by the drive motor 500. Referring to FIG. 5, a laser unit 105 is arranged on the optical box 104. A laser beam LB emitted by this laser unit 105 is condensed by lenses 106 and 107, to perform deflection scanning with respect to a photoreceptor 108, which is a recording medium responsive to the rotation of the rotating polygon mirror 101 by the drive motor 500.

EXAMPLE

Figure 6A:
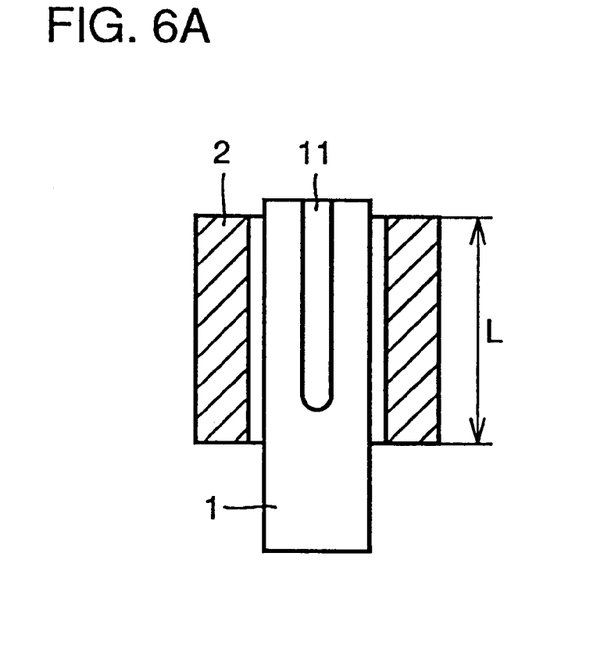
FIGS. 6A and 6B are schematic partial longitudinal sectional views employed for defining a bearing effective length in the hydrodynamic gas bearing structure according to the present invention.
Figure 6B:
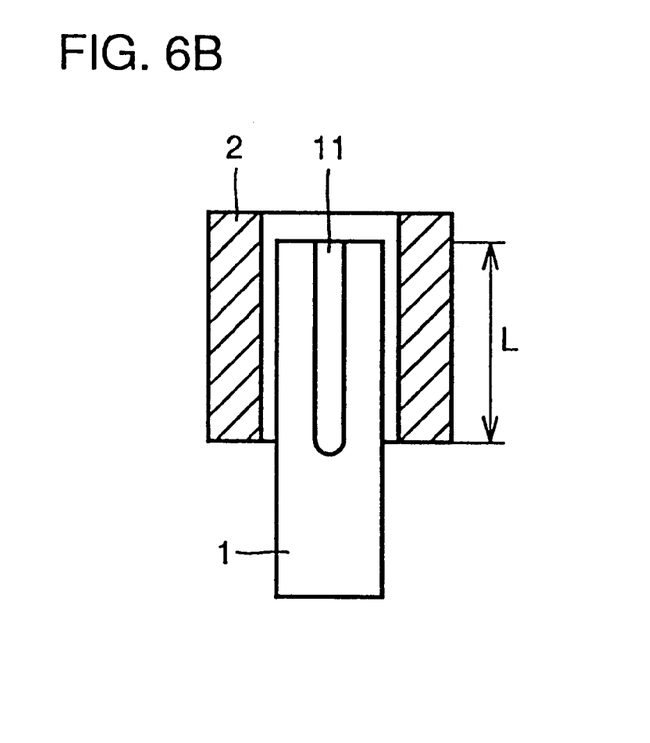

A shaft body consisting of a silicon nitride (the main component is $Si_3N_4$) sintered body whose diameter is 8 mm was prepared. A bearing body was so prepared that the mean value of the thickness of a clearance between the shaft body and the bearing body was 2.8 $\mu$m. The total weight of a rotator including the bearing body consisting of the silicon nitride sintered body was 50 g. The bearing effective length L (see FIG. 6A and FIG. 6B) of a hydrodynamic gas bearing structure thus configured as shown in FIG. 3 was 20 mm. Here, the bearing effective length is the length of a bearing body part opposed to or overlapping with the shaft body as shown in FIG. 6A and FIG. 6B, and means the length L of a bearing body part from which the generation of hydrodynamic forces can be expected. Three vertical grooves described later were formed on the shaft body at regular intervals in the circumferential direction for investigating rotational behavior. As to the working accuracy (out-of-roundness) of the parts forming the bearing structure, that of the shaft body was about 0.17 $\mu$m, and that of the bearing body was about 0.45 $\mu$m. The bearing body was rotated with respect to the shaft body. The bearing body was floated with a permanent magnet as to the thrust direction.

50 samples of the shaft body and the bearing body of such a combination were prepared for each shape of the respective grooves.

Concretely, samples A to D were prepared as shown in Table 1. In the sample A, a groove such as that shown in FIG. 7 was formed on a shaft body of 8 mm in diameter by performing the following working: First, the groove was formed on the shaft body by performing grinding once in a depth of cut of 5 $\mu$m in a direction parallel to the axis with a grindstone having a flat grinding surface, and thereafter successively performing grinding once in the depth of cut of 5 $\mu$m while rotating the shaft body by 4° in the circumferential direction, once in a depth of cut of 2.5 $\mu$m while further rotating the shaft body by 4° in the circumferential direction, and once in the depth of cut of 2.5 $\mu$m while finally rotating the shaft body by 4° in the circumferential direction again. As described in the column of remarks of Table 1, the grooving in this case is expressed in the numerical values of the depths of the successively cut concave parts, and referred to as grooving of 5-5-2.5-2.5 $\mu$m. In the present invention, worked shapes of grooves may be hereafter shown in such expression.

Figure 7:
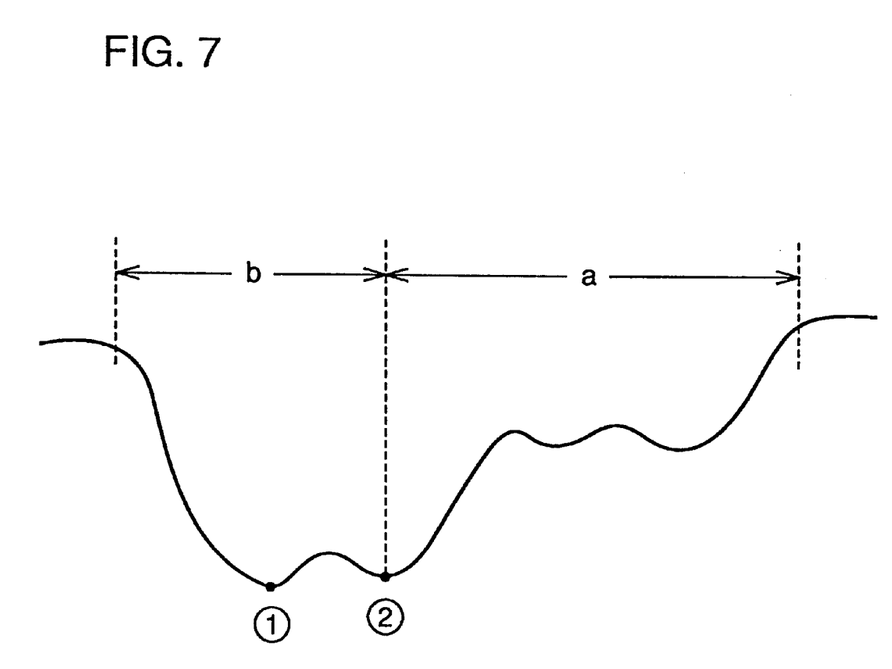
FIG. 7 is a partial sectional view showing the shape of the a groove formed in a sample A of Example of the invention.

When the shape of this groove was confirmed with an out-of-roundness measurer after the grinding, a groove having a circumferentially asymmetrical sectional shape as shown in FIG. 7 was obtained. Since the working was performed in units of 4° in the circumferential direction, parts between respective worked grooves were slightly shallower than the maximum depth at a center of each grinding location. The maximum depth $d_{max}$ of a part of an average sample cut in 5 $\mu$m was 5.2 $\mu$m, and the maximum depth of a part cut in 2.5 $\mu$m was 2.7 $\mu$m. While the deepest point of the part cut in 5 $\mu$m was either ① or ② in FIG. 7, the circumferential distances a and b (i.e., central angles corresponding to the distances) from this point to the right edge and the left edge of the groove were 11° and 9° respectively and the ratio of a/b was 1.22, when assuming that ② was the deepest point. When assuming that ① was the deepest point, on the other hand, the distances a and b were similarly 15° and 5° respectively, and the ratio of a/b was 3. The ratio of a/b exceeded 1 whether ① or ② was assumed to be the deepest point, and thus the ratio satisfying the conditions of the groove in the basic hydrodynamic gas bearing structure according to the present invention was obtained. Here the depth of the groove means a deviation of the sectional contour of the shaft body from a complete round shape toward the central direction. Thus, it was possible to obtain a shaft body on which respective grooves were formed at three circumferentially equally distributed locations.

Then, in the sample B, grooving of 10-10-5-2.5-2.5 $\mu$m was performed similarly to the sample A. When the groove shape was confirmed similarly to the sample A, the maximum depth of an average sample was 10.2 $\mu$m, angles corresponding to the circumferential distances a and b from the deepest point to both edges of the groove were 14° and 10° respectively assuming that a second concave part from the left end was the deepest point, and the ratio of a/b was 1.4. Thus, it was possible to obtain a shaft body in which respective grooves were formed at three circumferentially equally distributed locations.

As comparative example, samples C and D were prepared in working procedures similar to the above. Grooving of 6-6-6 $\mu$m was performed in the sample C, and no working of grooves was performed in the sample D. Measurement results of the aforementioned shapes are shown in Table 1.

Then, to determine the rotational behavior, the presence or absence of the occurrence of whirl (H/W) in high-speed rotation (rotational frequency: 25000 rpm), and the rotational frequencies (floating rotational frequencies) in which the bearing bodies and the shaft bodies came into contact with each other when gradually (naturally) reducing the rotational frequencies from high-speed rotation were measured as to clockwise rotation and counterclockwise rotation respectively. As to the floating rotational frequencies, the mean values and the maximum values in the number of the prepared samples were calculated. Table 2 shows these results.

In the sample C formed with grooves having a circumferentially symmetrical sectional shape, it was possible to suppress the occurrence of whirl in high-speed rotation, and while the sample exhibited no rotational anisotropy when the rotational frequency lowered, both the maximum value and the mean value were large in a prescribed rotational direction (i.e. the direction of clockwise rotation in this case), and dispersion thereof was also large.

In the samples A and B formed with the grooves having circumferentially asymmetrical sectional shapes, on the other hand, not only was it possible to suppress the occurrence of whirl in high-speed rotation, but also both the mean value and the maximum value of the floating rotational frequency in a prescribed rotational direction (clockwise rotation) were small and dispersion thereof was also small.

TABLE 1

| Sample Name | Effective Bearing Length (mm) | Groove Outline Groove Number (Number) | Groove Width (Degree) | Maximum Depth Deep Part (μm) | Maximum Depth Shallow Part (μm) | Distance (Angle) up to Groove End a (Degree) | Distance (Angle) up to Groove End b (Degree) | Correspondence to Present Invention | Remarks |
|---|---|---|---|---|---|---|---|---|---|
| A | 20 | 3 | 20 | 5.2 | 2.7 | 11 | 9 | ○ | 5-5-2.5-2.5 |
| B | 20 | 3 | 24 | 10.2 | 2.7 | 14 | 10 | ○ | 10-10-5-2.5-2.5 |
| C | 20 | 3 | 16 | 6.2 | — | — | — | X | 6-6-6 |
| D | 20 | — | — | — | — | — | — | X | no groove |

○: Present Invention
X: Comparative Example

TABLE 2

| | Presence/Absence of H/W | | Floating Rotational Frequency (rpm) | | | |
|---|---|---|---|---|---|---|
| | | | Mean Value | | Maximum Value | |
| Sample Name | Clockwise Rotation | Counterclockwise Rotation | Clockwise Rotation | Counterclockwise Rotation | Clockwise Rotation | Counterclockwise Rotation |
| A | no | no | 680 | 1500 | 4100 | 6700 |
| B | no | no | 720 | 1950 | 3500 | 7200 |
| C | no | no | 1030 | 1000 | 6500 | 5500 |
| D | yes | yes | 300 | 290 | 560 | 490 |

The embodiment and Examples disclosed in the above must be considered as being illustratively shown and not restrictive in all points. The scope of the present invention is shown not by the aforementioned embodiment or Examples but by the scope of claims, and includes all modifications and variations within the meaning and the range of equivalents of the scope of claims.

According to the hydrodynamic gas bearing structure of the present invention, as hereinabove described, a whirl phenomenon can be effectively prevented, it becomes possible to suppress dispersion of a floating rotational frequency in starting or stoppage of rotation, and a wear phenomenon can be effectively prevented, while the manufacturing yield of the shaft body can be improved in manufacturing of the hydrodynamic gas bearing structure. Therefore, the hydrodynamic gas bearing structure of the present invention is suitable for employment for a rotation driving part of an optical deflection scanner.

What is claimed is:

1. A hydrodynamic gas bearing structure comprising:

a hollow cylindrical bearing body (2) having an inner peripheral surface; and a columnar shaft body (1) that has an outer peripheral surface extending substantially cylindrically about a shaft body axis, and that is arranged at least partially within said hollow cylindrical bearing body so that at least a portion of said outer peripheral surface is opposed to at least a portion of said inner peripheral surface with a radial clearance therebetween;

wherein:

said shaft body has at least one groove (11) extending parallel to said shaft body axis in said outer peripheral surface (Q);

said groove has a peripheral contour (S) having a first edge (16) and a second edge (17) opposite one another respectively where said peripheral contour (S) adjoins said outer peripheral surface (Q), and having a deepest point (14) at which said peripheral contour is farthest from said outer peripheral surface and closest to said shaft body axis; and said peripheral contour (S) is asymmetrical in a circumferential direction about said shaft body axis, such that said deepest point (14) is circumferentially closer to said second edge (17) than to said first edge (16).

2. The hydrodynamic gas bearing structure according to claim 1, wherein said shaft body is arranged coaxially within said hollow cylindrical bearing body about said shaft body axis, such that said radial clearance forms a substantially cylindrical annular clearance between said outer peripheral surface and said inner peripheral surface, when said bearing structure is at rest without relative rotation between said shaft body and said bearing body.

3. The hydrodynamic gas bearing structure according to claim 1, wherein said first edge (16) is located downstream from said second edge (17) with respect to a gas flow direction (P) of a gas current generated in said radial clearance by relative rotation between said shaft body and said bearing body in a nominal rotation direction assigned to said bearing structure.

4. The hydrodynamic gas bearing structure according to claim 3, wherein said peripheral contour of said groove has an asymmetric contour shape on a section plane perpendicular to said shaft body axis, wherein a first circumferential distance (a) between said first edge (16) and a radial line (C) extending from said shaft body axis through said deepest point (14) is larger than a second circumferential distance (b) between said second edge (17) and said radial line (C).

5. The hydrodynamic gas bearing structure according to claim 1, wherein said peripheral contour of said groove has an asymmetric contour shape on a section plane perpendicular to said shaft body axis, wherein a first circumferential distance (a) between said first edge (16) and a radial line (C) extending from said shaft body axis through said deepest point (14) is larger than a second circumferential distance (b) between said second edge (17) and said radial line (C).

6. The hydrodynamic gas bearing structure according to claim 5, wherein a ratio of said first circumferential distance (a) relative to said second circumferential distance (b) is at least 1.22.

7. The hydrodynamic gas bearing structure according to claim 1, wherein said groove consists of at least two concave groove parts that are adjacent and adjoin each other in a circumferential direction and that respectively have respective depths that are substantially different from each other as measured in a radial direction from said outer peripheral surface toward said shaft body axis.

8. The hydrodynamic gas bearing structure according to claim 7, wherein one of said respective depths is at least twice the other of said respective depths.

9. An optical deflection scanner comprising the hydrodynamic gas bearing structure according to claim 7 and a mirror rotatably supported thereon.

10. An optical deflection scanner comprising the hydrodynamic gas bearing structure according to claim 1 and a mirror rotatably supported thereon.

* * * * *

UNITED STATES PATENT AND TRADEMARK OFFICE
CERTIFICATE OF CORRECTION

PATENT NO. : 6,123,460
DATED : September 26, 2000
INVENTOR(S) : Takeuchi, et al.

It is certified that error appears in the above-identified patent and that said Letters Patent is hereby corrected as shown below:

On the Title Page: under [56], References Cited
FOREIGN PATENT DOCUMENTS"
line 6, before "1/1993", replace "05011715A" by --05001715A--

UNDER [57] ABSTRACT,
line 12, after "distance", replace "a" by --$\underline{a}$--;
line 19, after "distance", replace "a" by --$\underline{a}$--;

| | | |
|---|---|---|
| Col. 2, | line 2, | after "rotation", delete "distribution"; |
| Col. 3, | line 39, | after "distance", replace "a" by --$\underline{a}$--; |
| | line 42, | after "distance", replace "a" by --$\underline{a}$--; |
| | line 50, | after "distance", replace "a" by --$\underline{a}$--; |
| | line 63, | after "distance", replace "a" by --$\underline{a}$--; |
| Col. 4, | line 20, | after "waveform", replace "cause" by --caused--; |
| Col. 5, | line 2, | before "Example", insert --the--; |
| | line 53, | after "dynamic", insert --forces--; |
| Col. 7, | line 9, | after "medium", insert --,--; |
| Col. 8, | line 3, | after "distances", replace "a" by --$\underline{a}$--; |
| | line 8, | after "distances", replace "a" by --$\underline{a}$--; |
| | line 26, | after "distances", replace "a" by --$\underline{a}$--. |

Signed and Sealed this

Seventeenth Day of April, 2001

Attest:

NICHOLAS P. GODICI

Attesting Officer

Acting Director of the United States Patent and Trademark Office